(12) United States Patent
Cho

(10) Patent No.: US 12,716,548 B2
(45) Date of Patent: Aug. 25, 2026

(54) GREASE FILLING APPARATUS FOR MANUAL GREASE GUN

(71) Applicant: Duk-haeng Cho, Gyeonggi-do (KR)

(72) Inventor: Duk-haeng Cho, Gyeonggi-do (KR)

( * ) Notice: Subject to any disclaimer, the term of this patent is extended or adjusted under 35 U.S.C. 154(b) by 300 days.

(21) Appl. No.: 18/711,101

(22) PCT Filed: Oct. 21, 2022

(86) PCT No.: PCT/KR2022/016161
§ 371 (c)(1),
(2) Date: May 16, 2024

(87) PCT Pub. No.: WO2023/090666
PCT Pub. Date: May 25, 2023

(65) Prior Publication Data

US 2026/0168618 A1 Jun. 18, 2026

(30) Foreign Application Priority Data

Nov. 19, 2021 (KR) ........................ 10-2021-0160229

(51) Int. Cl.
*F16N 37/02* (2006.01)
*F16N 3/12* (2006.01)
(Continued)

(52) U.S. Cl.
CPC ............. *F16N 37/02* (2013.01); *F16N 13/06* (2013.01); *F16N 21/06* (2013.01); *F16N 23/00* (2013.01); *F16N 3/12* (2013.01)

(58) Field of Classification Search
CPC . F16N 3/12; F16N 13/06; F16N 21/06; F16N 23/00; F16N 37/02
See application file for complete search history.

(56) References Cited

U.S. PATENT DOCUMENTS 2,268,592 A * 1/1942 Hothersall .............. F16N 37/02
222/386
2,443,981 A * 6/1948 Funk ....................... F16N 37/02
141/357

(Continued)

FOREIGN PATENT DOCUMENTS

CH 166887 1/1934
DE 102022118743 B4 10/2024
(Continued)

OTHER PUBLICATIONS

PCT/KR2022/016161 Srch Rpt, Feb. 24, 2023, Duk-haeng Cho.

*Primary Examiner* — Timothy L Maust
(74) *Attorney, Agent, or Firm* — Wells St. John P.S.

(57) ABSTRACT

A grease filling apparatus for a manual grease includes a second valve means in the cylinder within the charging tank through the cover, a first valve means in the piston that is tightly inserted into the cylinder through the cover and that moves up and down, and a conventional manual grease gun detachably installed on the upper side of the piston, which is advantageous in terms of enabling fully filling the manual grease gun in a short time with the grease from the charging tank without air pocket formation using a pumping force of the piston, preventing grease from being smeared on the outside of the opening portion of the manual grease gun, thereby decreasing grease consumption, and improving cleanliness around the worksite.

7 Claims, 5 Drawing Sheets

(51) Int. Cl.

| | |
|---|---|
| ***F16N 13/06*** | (2006.01) |
| ***F16N 21/06*** | (2006.01) |
| ***F16N 23/00*** | (2006.01) |

(56) References Cited

U.S. PATENT DOCUMENTS

| | | | | |
|---|---|---|---|---|
| 5,469,897 | A | 11/1995 | Haytner | |
| 11,092,283 | B2 * | 8/2021 | Lee | F16N 25/00 |
| 2007/0034451 | A1 | 2/2007 | Liao | |

FOREIGN PATENT DOCUMENTS

| | | |
|---|---|---|
| KR | 10-0414910 | 1/2004 |
| KR | 20-0415572 | 5/2006 |
| KR | 10-1915069 | 11/2018 |
| KR | 10-1942964 | 1/2019 |
| KR | 10-2019-0117980 | 10/2019 |

* cited by examiner

[FIG. 1]
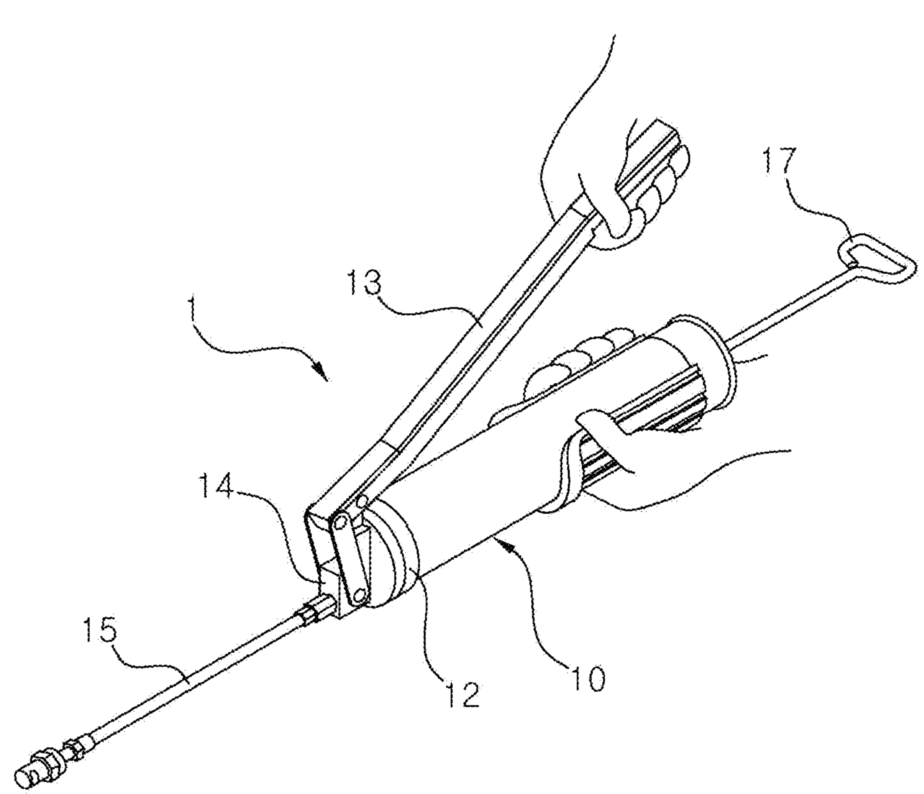

[FIG. 2]
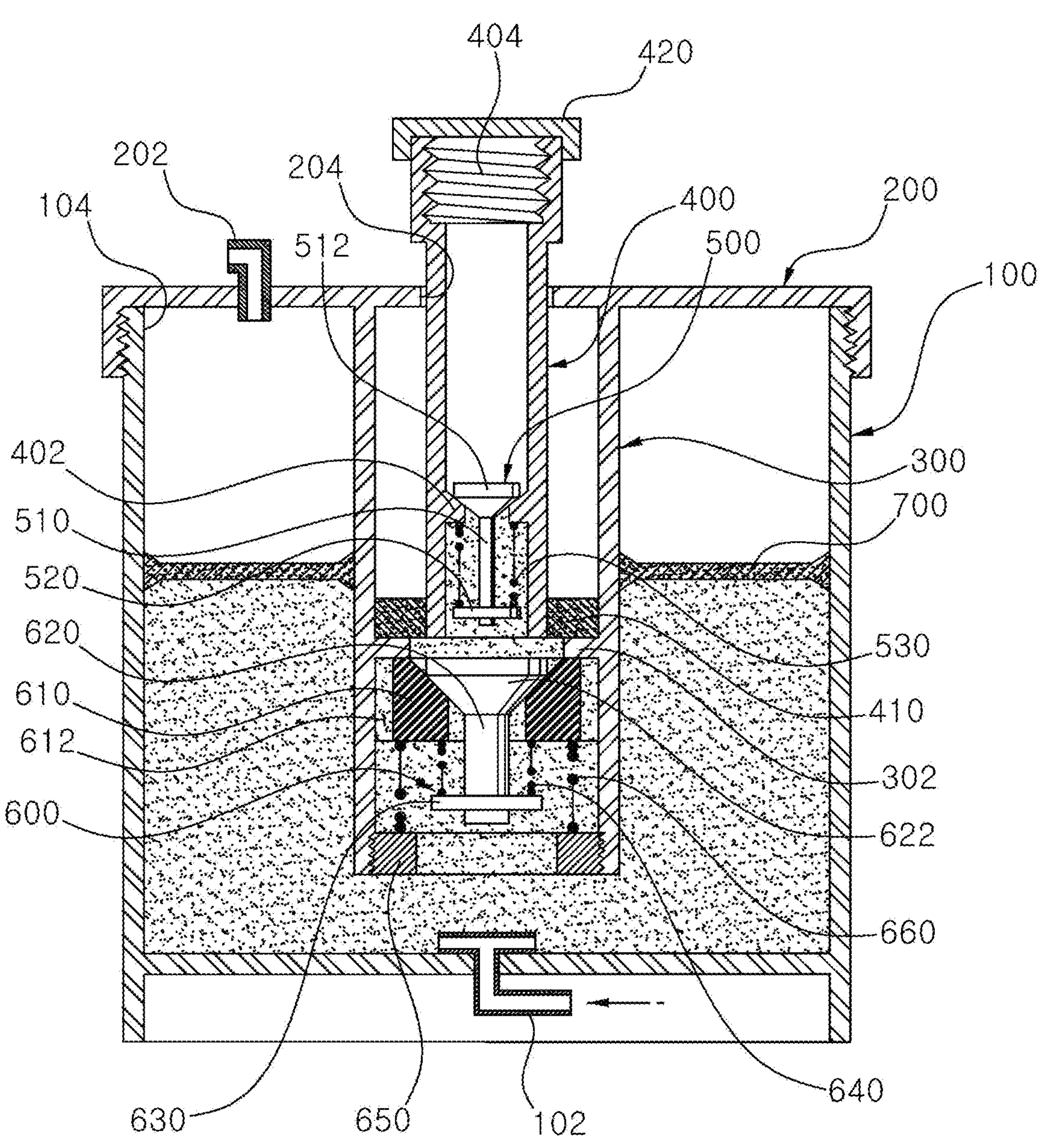

[FIG. 3]
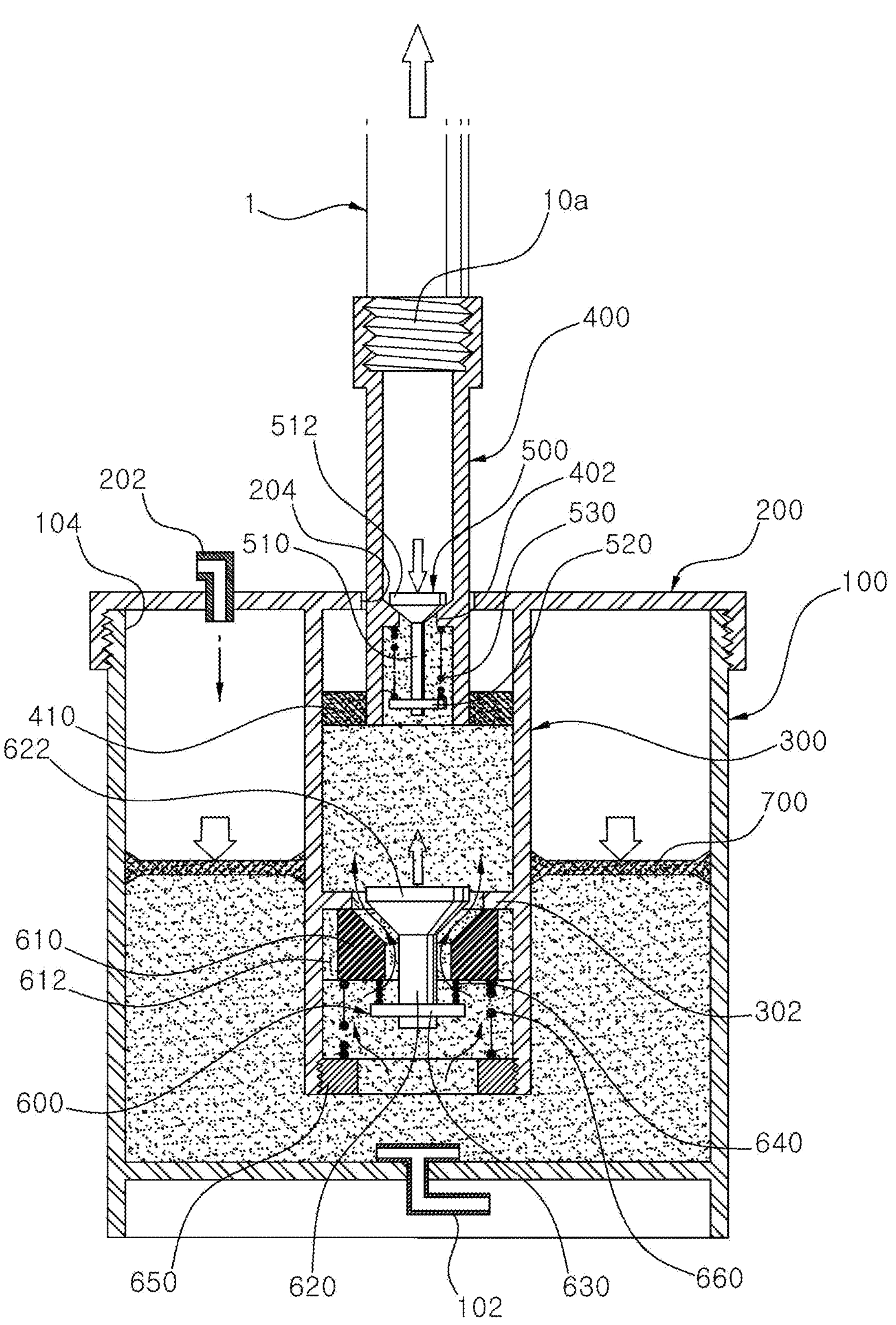

[FIG. 4]
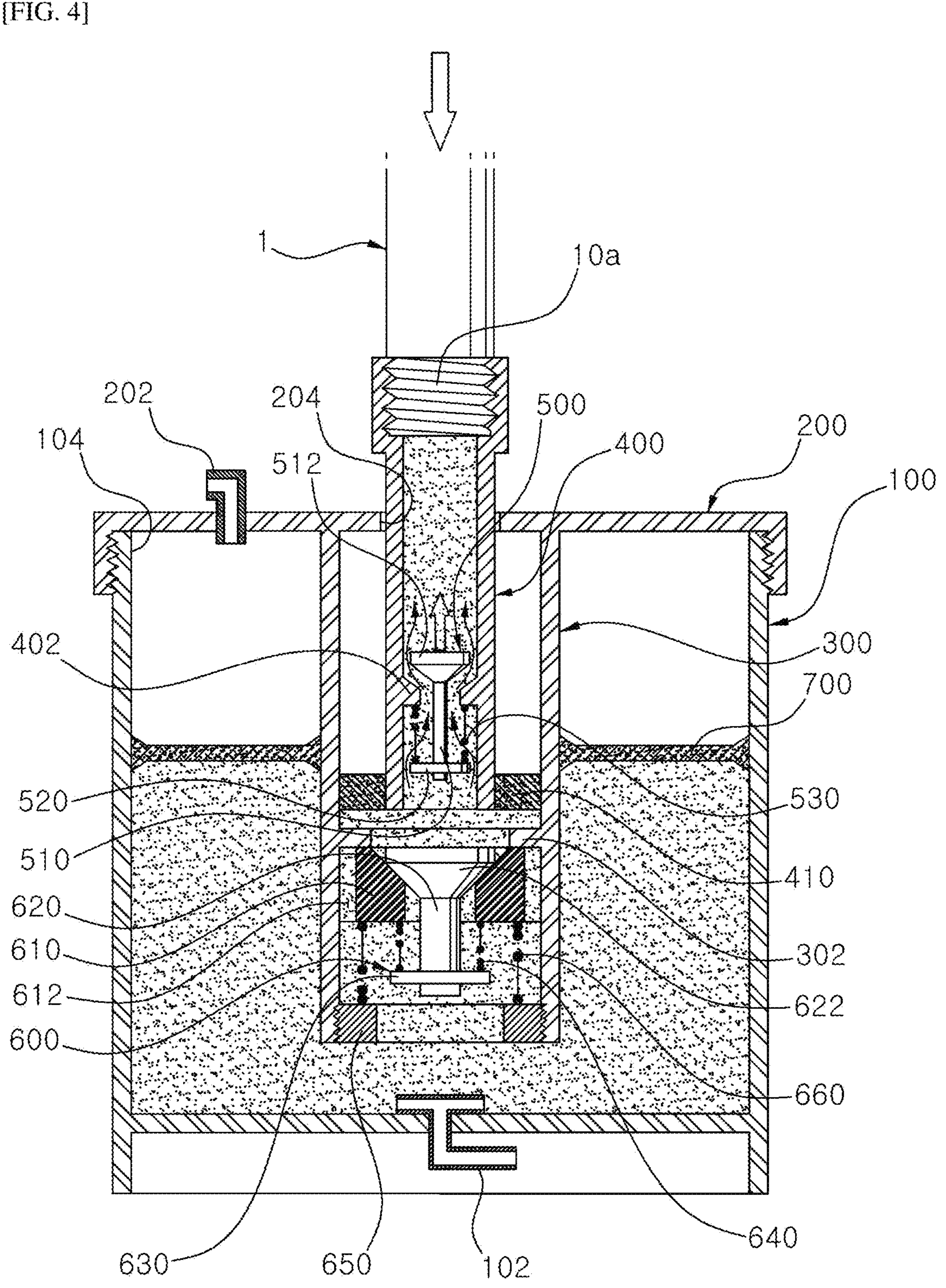

[FIG. 5]
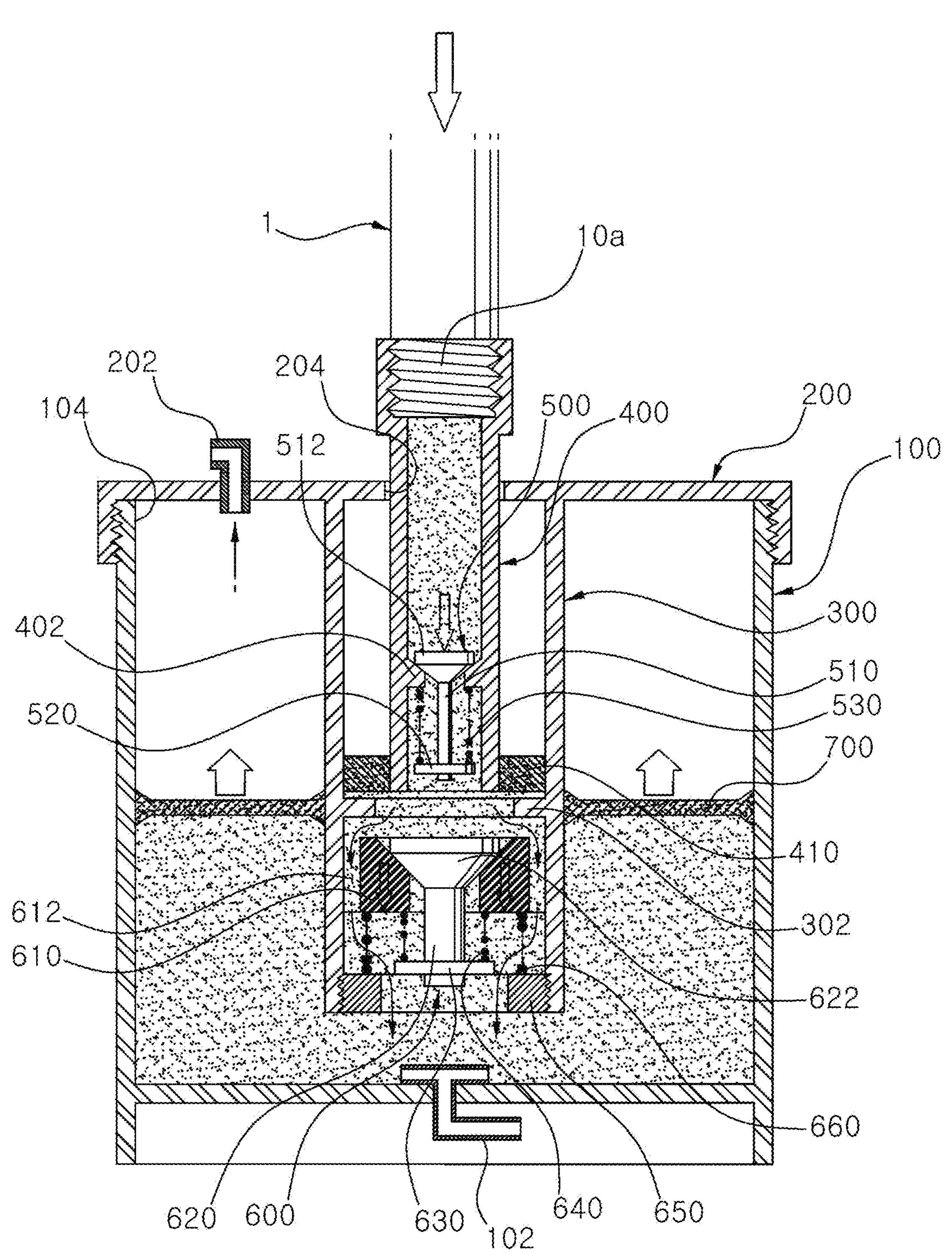

GREASE FILLING APPARATUS FOR MANUAL GREASE GUN

CROSS REFERENCE TO RELATED APPLICATION

This is a 35 U.S.C. § 371 application of, and claims priority to, International Application No. PCT/KR2022/016161, filed on Oct. 21, 2022, which was published as WO2023/090666A1 on May 25, 2023, and which claims priority to Korean Patent Application No. 10-2021-0160229, which was filed on Nov. 19, 2021, the entirety of each of which is incorporated by reference herein.

TECHNICAL FIELD

This application claims priority to and the benefit of Korean Patent Application No. 10-2021-0160229 filed on Nov. 19, 2021, and entire contents thereof are incorporated herein by reference.

TECHNICAL FIELD

This invention relates to a grease filling apparatus for a manual grease gun, and more particularly, to a grease filling apparatus for a manual grease gun that is capable of connecting the manual grease gun to a charging tank and loading the grease in the charging tank using pumping force.

BACKGROUND ART

Traditional manual grease guns, as illustrated in FIG. 1, consist of a body 10 in the form of a pipe containing grease and a nozzle 15 located at the front of the body 10 for dispensing the grease.

The grease within the body 10 is discharged externally via a pumping mechanism, which includes a discharge member (not shown) mounted within the body 10 in a piston-like manner and a discharge handle 13 connected to the discharge member via a linkage 14.

In this case, a detachable cap 12 is screw-fastened to the front portion of the body 10, the nozzle 15 is connected to the cap 12 via the linkage 14, and the nozzle 15 discharges the grease contained within the body 10 to the exterior when the grease is pumped. In the drawing, the unexplained reference numeral 17 denotes a pull ring that connects to the discharge member.

However, conventional manual grease guns configured as such has a drawback in that when all the grease within the body 10 has been depleted, a refilling work is performed in such a manner that the cap 12 is detached from the front portion of the body 10, a front opening portion of the body 10 is connected to a charging tank (not shown), and a direct suction method via the pumping mechanism is used to load the grease in the charging tank into the body 10, resulting in air pockets forming at a suction point during multiple suctions, leading to improper charging.

Additionally, a notable issue arose when using rags to clean the grease accumulated at the front opening portion of body 10, resulting in significant residual grease being disposed and increased a grease consumption. When leaving the contaminated rags at the worksite, it caused not only inconvenience to workers and nearby facilities due to grease stains but also posed environmental pollution risks.

PRIOR TECHNICAL DOCUMENTS

Patent Document (Patent Document 1) Korean Registered Utility Model No. 20-0415572 (20006.04.27.)

DISCLOSURE

Technical Problem

The present invention has been conceived to solve the above problems and it is an object to provide a grease filling apparatus for a manual grease gun that is capable of quick and complete charging without air pocket formation, preventing grease accumulation at a front opening portion of the manual grease gun to reduce grease consumption, and improving environments around the worksite by eliminating the use of rags for cleaning the manual grease gun.

Technical Solution

In order to accomplish the above objects, a grease filling apparatus for a manual grease gun according to an embodiment of the present invention includes a cylindrical charging tank configured to store grease supplied through a check valve at a bottom portion thereof, a cover including an air passage on one side to supply air into the charging tank and a through hole formed at a center thereof and configured to be screwed onto an upper opening portion of the charging tank, a cylinder vertically coupled to the cover in a center of a lower surface of the cover, establishing coaxial passage with the through hole of the cover, and extending adjacent to a bottom of the charging tank, a piston sealingly coupled to an inner surface of the cylinder via a packing member at a bottom portion thereof and configured to detachably connect to a manual grease gun at a top portion thereof, allowing to ascend and descend within the cylinder by moving up and down the manual grease gun, a first valve means installed in a lower part of the piston to open a passage in response to the piston descending to suck the grease inside the cylinder into the piston by a pumping force or to close the passage in response to the piston ascending, and a second valve means installed in the lower part of the cylinder to close the passage in response to the piston descending or open the passage in response to the piston ascending to suck the grease inside the charging tank into the cylinder by the pumping force.

According to an embodiment of the present invention, the piston includes a female screw formed at a top portion thereof to be coupled with a male screw formed at a front opening portion of the manual grease gun.

According to an embodiment of the present invention, the first valve means includes a first head positioned on an upper surface of a ring-shaped first stopper ridge formed at a predetermined height from the bottom portion of the piston, a first shaft connected at a center of a lower surface of the first head to pass through a center of the first stopper ridge, a first nut fastened to a bottom portion of the first shaft, and a first coil spring positioned between an edge of the lower surface of the first stopper ridge and an upper surface of the first nut to apply elasticity for the first head to be firmly seated on the upper surface of the first stopper ridge.

According to an embodiment of the present invention, the first head, first shaft, first nut, and first coil spring are supported on the first stopper ridge with a predetermined gap from an inner surface of the piston for the first head to ascend and descend to open and close the passage based on the first head which contacts with or moves away from the upper surface of the first stopper ridge.

According to an embodiment of the present invention, the second valve means includes a ring-shaped housing positioned on a lower surface of a ring-shaped second stopper ridge formed at a predetermined height inside the cylinder, a second head positioned on an upper surface of the housing, a second shaft connected at a center of a lower surface of the second head to pass through a center of the housing, a second nut fastened to a bottom portion of the second shaft, a second coil spring positioned between an inner edge of the lower surface of the housing and an upper surface of the second nut to apply elasticity for the second head to be firmly seated on the upper surface of the housing, a third nut fastened to a bottom portion of the cylinder, and a third coil spring positioned between an outer edge of the lower surface of the housing and an upper surface of the third nut to apply elasticity for the housing to ascend and descend.

According to an embodiment of the present invention, the housing includes a plurality of recesses formed on an outer peripheral surface thereof with passages open in upper, lower, and side directions at predetermined intervals along the circumferential direction of the housing to collect grease remaining in an upper part of the cylinder into a lower part of the second valve means when the housing is separated from the second stopper ridge by a pumping force of the piston moving downward.

According to an embodiment of the present invention, the apparatus further includes a ring-shaped pressure plate positioned between an inner surface of the charging tank and an outer surface of the cylinder to press down the grease inside the charging tank.

Advantageous Effects

Since the grease filling apparatus for a manual grease gun according to the present invention includes a second valve means in a cylinder within a charging tank, a first valve means in the piston that is tightly and slidably inserted into the cylinder and that moves up and down, and a conventional manual grease gun is detachably coupled on an upper side of the piston, it is advantageous in terms of enabling fully charging the manual grease gun in a short time with the grease from the charging tank without air pocket formation using a pumping force generated by raising and lowering movement of the piston, preventing grease from being smeared on an outside of an opening portion formed on front-side female screw portion of the manual grease gun, thereby decreasing grease consumption, eliminating inconvenience and hassle of wiping the opening portion of the female screw portion with a rag or the like after the manual grease gun is fully filled with the grease, and improving cleanliness around the worksite.

DESCRIPTION OF DRAWINGS

FIG. 1 is a perspective view illustrating a conventional manual grease gun in use;

FIG. 2 is a vertical cross-sectional view illustrating an initial non-use state of a grease filling apparatus according to the present invention;

FIG. 3 is a vertical cross-sectional view illustrating a descending motion state of a grease filling apparatus according to the present invention;

FIG. 4 is a vertical cross-sectional view illustrating an ascending motion state of a grease filling apparatus according to the present invention; and FIG. 5 is a vertical cross-sectional view illustrating an operation state of pushing residual grease into a charging tank for an initial state of the grease filling apparatus according to the present invention.

MODE FOR INVENTION

Hereinafter, the preferred embodiment of the present invention is described with reference to accompanying FIGS. 2 to 5 to facilitate a comprehensive understanding of the invention. The embodiments of the present invention can be modified in various forms, and the scope of the invention should not be interpreted as being limited to the embodiments detailed below. It should be noted that the same components are indicated by the same reference numerals through the drawings. Detailed descriptions of well-known functions and structures may be omitted to avoid obscuring the subject matter of the present invention.

For reference, identical components to the prior art use the same names and reference numerals to avoid redundancy.

Referring to FIGS. 2 to 5, a grease filling apparatus for a manual grease gun according to an embodiment of the present invention includes a cylindrical charging tank 100 for storing grease received and supplied through a check valve 102 at the bottom portion thereof, a cover 200 including an air passage 202 on one side to supply air into the charging tank 100 and a through hole 204 formed at a center and configured to be screwed onto an upper opening portion 104 of the charging tank 100, a cylinder 300 vertically coupled to the cover 200 in the center of a lower surface of the cover 200, establishing a coaxial passage with a through hole 204, and extending adjacent to a bottom of the charging tank 100, a piston 400 sealingly coupled to an inner surface of the cylinder 300 through a packing member 410 at a bottom portion thereof and configured to detachably connect to a manual grease gun 1 at a top portion thereof, allowing to ascend and descend within the cylinder 300 by moving up and down the manual grease gun 1, a first valve means 500 installed in a lower part of the piston 400 to open the passage in response to the piston 400 descending to suck the grease inside the cylinder 300 into the piston 400 by a pumping force or to close the passage in response to the piston 400 ascending, and a second valve means 600 installed in the lower part of the cylinder 300 to close the passage in response to the piston 400 descending or open the passage in response to the piston 400 ascending to suck the grease inside the charging tank 100 into the cylinder 300 by the pumping force.

The charging tank 100 and the cover 200 may also be secured by a metal tie band not shown in the drawing after being screwed together to prevent a joint portion from being separated.

A ring-shaped pressure plate 700 is positioned between an inner surface of the charging tank 100 and an outer surface of the cylinder 300 to pressurize the grease inside the charging tank 100, and preferably, the outer surface and inner surface of the pressure plate 700 are configured in the form of a rubber packing that tightly adheres to the inner surface of the charging tank 100 and the outer surface of the cylinder 300.

Here, the pressure plate 700 presses down the grease filled inside the charging tank 100 and moves downward to prevent formation of air pockets, allowing the grease to be suctioned into the cylinder 300 according to a predetermined suction volume and speed.

The check valve 102 is preferably installed at a center of a bottom portion of the charging tank 100 to allow the grease to be supplied from an outside into the charging tank 100 when all the grease therein has been depleted.

The piston 400 includes a female screw 404 formed at a top portion thereof to be coupled with a male screw 10*a* formed at a front opening portion of the manual grease gun 1.

In this case, the male screw 10*a* of the manual grease gun 1 refers to the surface formed on the front opening portion of the body 10 from which the cap 12 is removed, as shown in FIG. 1.

The first valve means 500 includes a first head 512 positioned on an upper surface of a ring-shaped first stopper ridge 402 formed at a predetermined height from a bottom portion of the piston 400, a first shaft 510 connected at a center of a lower surface of the first head 512 to pass through a center of the first stopper ridge 402, a first nut 520 fastened to a bottom portion of the first shaft 510, and a first coil spring 530 positioned between an edge of the lower surface of the first stopper ridge 402 and an upper surface of the first nut 520 to apply elasticity to ensure that the first head 512 is firmly seated on the upper surface of the first stopper ridge 402.

That is, the first head 512, first shaft 510, first nut 520, and first coil spring 530 are supported on the first stopper ridge 402 with a predetermined gap from the inner surface of the piston 400, allowing the first head 512 to ascend and descend to open and close the passage as the first head 512 makes contact with or moves away from the upper surface of the first stopper ridge 402.

Here, it is preferable to form a perimeter of the first head 512 and the upper surface of the first stopper ridge 402 in a conical shape gradually widening from the bottom to the top, ensuring they correspondingly match and increase a sealing force when opening or closing the passage, while stabilizing placement of the first head 512 at the center of the first stopper ridge 402.

The second valve means 600 includes a ring-shaped housing 610 positioned on a lower surface of a ring-shaped second stopper ridge 302 formed at a predetermined height inside the cylinder 300, a second head 622 positioned on an upper surface of the housing 610, a second shaft 620 connected at a center of a lower surface of the second head 622 to pass through a center of the housing 610, a second nut 630 fastened to a bottom portion of the second shaft 620, a second coil spring 640 positioned between an inner edge of the lower surface of the housing 610 and an upper surface of the second nut 630 to apply elasticity ensuring that the second head 622 is firmly seated on the upper surface of the housing 610, a third nut 650 fastened to a bottom portion of the cylinder 300, and a third coil spring 660 positioned between an outer edge of the lower surface of the housing 610 and an upper surface of the third nut 650 to apply elasticity allowing the housing 610 to rise and fall.

On the outer peripheral surface of the housing 610, a plurality of recesses 612 are formed with passages open in the upper, lower, and side directions at predetermined intervals along a circumferential direction of the housing 610 to collect the grease remaining in an upper part of the cylinder 300 into a lower part of the second valve means 600 when the housing 610 is separated from the second stopper ridge 302 by a pumping force of the piston 400 moving downward.

In this case, the plurality of recesses 612 functions to close the passages when the housing 610 ascends and comes into contact with the lower surface of the second stopper ridge 302, and to open the passages when the housing 610 descends and is separated from the second stopper ridge 302 by a predetermined distance, thereby allowing the grease remaining between the first valve means 500 and the second valve means 600 to be discharged to the lower part of the cylinder 300.

It is preferable to form the upper surface of the housing 610 and the perimeter of the second head 622 in a conical shape gradually widening from the bottom to the top, ensuring they correspondingly match and increase a sealing force when opening or closing the passage, while stabilizing placement of the second head 622 at the center of the housing 610.

It is preferable to configure an outer diameter of the second nut 630 to be smaller than an inner diameter of the third nut 650, so as not to obstruct the passage when the grease is sucked into the cylinder 300 through the inner diameter of the third nut 650.

The second coil spring 640 is designed to have less elasticity than the third coil spring 660, allowing ascending movement of the second head 622 to occur before ascending movement of the housing 610.

The unexplained reference numeral 420 in the drawing denotes a cap that seals an upper opening portion of the piston 400 when the grease filling apparatus is not in use.

To charge grease into a manual grease gun 1 using the grease filling apparatus of the present invention configured as described above, it is necessary to first remove the cap 420 as shown in FIG. 2, then connect the male screw 10*a* of the manual grease gun 1 to the female screw 404 of the piston 400 as shown in FIG. 3, and then pull the grease gun 1 to move the piston 400 upward for generating a pumping force while the packing member 410 attached to the lower outer peripheral surface of the piston 400 slides along the inner surface of the cylinder 300.

That is, the first head 512 of the first valve means 500 inside the piston 400 descends by an elastic force of the first coil spring 530 and rests on the first stopper ridge 402 of the piston 400, thereby closing a passage through the first valve means 500.

As the piston 400 ascends, a vacuum pressure generated by the pumping force causes the second head 622 of the second valve means 600 inside the cylinder 300 to rise, opening the passage previously blocked by the housing 610, allowing the grease from the charging tank 100 to be sucked into the cylinder 300 through a lower opening portion and simultaneously filling the housing 610 as indicated by the arrow direction shown in FIG. 3 down to the lower part of the piston 400.

In this case, the pressure plate 700 installed inside the charging tank 100 descends under an influence of external air flowing through the air passage 202 of the cover 200, pressurizing the grease inside the charging tank 100 downwards, ensuring the grease remains horizontally balanced and maintaining the vacuum pressure inside the charging tank 100.

As the piston 400 is pressed down by pushing the grease gun 1 down as shown in FIG. 4, the second head 622 of the second valve means 600 within the cylinder 300, previously raised by the pumping force, descends to close the passage of the housing 610, while the first head 512 of the first valve means 500 within the piston 400 rises from the first stopper ridge 402 of the piston 400 due to a pressure pushing the grease upwards, opening the passage, allowing the grease suctioned between the first valve means 500 and the second valve means 600 to be drawn into the body 10 of the manual grease gun 1 through the passage of the piston 400, in a direction indicated by the arrows in FIG. 4.

Each time the piston 400 is raised repeatedly, the grease from the charging tank 100 is drawn into a space between the first valve means 500 and the second valve means 600 through the lower part of the cylinder 300, and each time the piston 400 is lowered repeatedly, the grease filled between the first valve means 500 and the second valve means 600 is suctioned into the manual grease gun 1 through the piston 400, ensuring that the grease is fully charged within the manual grease gun 1.

When the grease is fully charged inside the manual grease gun 1 and then the piston 400 is pressed down again with a force greater than that at the suction operation of FIG. 4, as shown in FIG. 5, the grease filled between the first valve means 500 and the second valve means 600 within the cylinder 300 exerts a downward pressure on the second head 622 lowered to close a central passage of the housing 610, and as a result, the housing 610 descends along with the second head 622, creating a gap between the housing 610 and the second stopper ridge 302, allowing the remaining grease trapped between the first valve means 500 and the second valve means 600 to be discharged into the charging tank 100 through the recesses 612 formed on the outer surface of the housing 610 in a direction indicated by the arrows as shown in FIG. 5, thus maintaining the initial state as shown in FIG. 2 for charging the grease into the manual grease gun 1 afterward.

As described above, a grease filling apparatus for a manual grease gun according to the present invention, which is characterized by the installation of a second valve means 600 in the cylinder 300 within the charging tank 100 through the cover 200, the installation of a first valve means 500 in the piston 400 that is tightly and slidably inserted into the cylinder 300 through the cover 200 and that moves up and down, and the detachable installation of a conventional manual grease gun 1 on the upper side of the piston 400, is advantageous in terms of enabling fully filling the manual grease gun 1 in a short time with the grease from the charging tank 100 without air pocket formation through the cylinder 300 and the piston 400 using a pumping force generated by raising and lowering movement of the piston 400 through the grease gun 1, preventing grease from being smeared on the outside of the opening formed on the front-side male screw 10*a* of the manual grease gun 1, thereby decreasing grease consumption, eliminating the inconvenience and hassle of wiping the opening portion of the male screw 10*a* with a rag or the like after the manual grease gun 1 is fully filled with the grease, and improving cleanliness around the worksite.

Meanwhile, the present invention encompasses not only the embodiments described above but also any modifications or variations that fall within the spirit of the invention, and such modifications and variations are considered to be covered by the claims below.

*DESCRIPTION OF REFERENCE NUMERALS*

| | |
|---|---|
| 1: manual grease gun | 10a: male screw surface |
| 100: charging tank | 102: check valve |
| 104: opening portion | 200: cover |
| 202: air passage | 204: through hole |
| 300: cylinder | 302: second stopper ridge |
| 400: piston | 402: first stopper ridge |

-continued

*DESCRIPTION OF REFERENCE NUMERALS*

| | |
|---|---|
| 404: female screw surface | 410: packing member |
| 500: first valve means | 512: first head |
| 510: first shaft | 520: first nut |
| 530: first coil spring | 600: second valve means |
| 610: housing | 612: recess |
| 620: second shaft | 622: second head |
| 630: second nut | 640: second coil spring |
| 650: third nut | 660: third coil spring |
| 700: pressure plate | |

What is claimed is:

1. A grease filling apparatus for a manual grease gun, the apparatus comprising:

a cylindrical charging tank configured to store grease supplied through a check valve at a bottom portion thereof;

a cover comprising an air passage on one side to supply air into the charging tank and a through hole formed at a center thereof and configured to be screwed onto an upper opening portion of the charging tank;

a cylinder vertically coupled to the cover in a center of a lower surface of the cover, establishing coaxial passage with the through hole of the cover, and extending adjacent to a bottom portion of the charging tank;

a piston sealingly coupled to an inner surface of the cylinder via a packing member at a bottom portion thereof and configured to detachably connect to a manual grease gun at a top portion thereof, allowing to ascend and descend within the cylinder by moving up and down the manual grease gun;

a first valve means installed in a lower part of the piston to open a passage in response to the piston descending to suck the grease inside the cylinder into the piston by a pumping force or to close the passage in response to the piston ascending; and a second valve means installed in the lower part of the cylinder to close the passage in response to the piston descending or open the passage in response to the piston ascending to suck the grease inside the charging tank into the cylinder by the pumping force.

2. The apparatus of claim 1, wherein the piston comprises a female screw formed at a top portion thereof to be coupled with a male screw formed at a front opening portion of the manual grease gun.

3. The apparatus of claim 1, wherein the first valve means comprises:

a first head positioned on an upper surface of a ring-shaped first stopper ridge formed at a predetermined height from the bottom portion of the piston;

a first shaft connected at a center of a lower surface of the first head to pass through a center of the first stopper ridge;

a first nut fastened to a bottom portion of the first shaft; and a first coil spring positioned between an edge of the lower surface of the first stopper ridge and an upper surface of the first nut to apply elasticity for the first head to be firmly seated on the upper surface of the first stopper ridge.

4. The apparatus of claim 3, wherein the first head, first shaft, first nut, and first coil spring are supported on the first stopper ridge with a predetermined gap from an inner surface of the piston for the first head to ascend and descend to open and close the passage based on the first head which contacts with or moves away from the upper surface of the first stopper ridge.

5. The apparatus of claim 1, wherein the second valve means comprises:

a ring-shaped housing positioned on a lower surface of a ring-shaped second stopper ridge formed at a predetermined height inside the cylinder;

a second head positioned on an upper surface of the housing;

a second shaft connected at a center of a lower surface of the second head to pass through a center of the housing;

a second nut fastened to a bottom portion of the second shaft;

a second coil spring positioned between an inner edge of the lower surface of the housing and an upper surface of the second nut to apply elasticity for the second head to be firmly seated on the upper surface of the housing;

a third nut fastened to a bottom portion of the cylinder; and a third coil spring positioned between an outer edge of the lower surface of the housing and an upper surface of the third nut to apply elasticity for the housing to ascend and descend.

6. The apparatus of claim 5, wherein the housing comprises a plurality of recesses formed on an outer peripheral surface thereof with passages open in upper, lower, and side directions at predetermined intervals along the circumferential direction of the housing to collect the grease remaining in the upper part of the cylinder into the lower part of the second valve means when the housing is separated from the second stopper ridge by a pumping force of the piston moving downward.

7. The apparatus of claim 1, further comprising a ring-shaped pressure plate positioned between an inner surface of the charging tank and an outer surface of the cylinder to press down the grease inside the charging tank.

* * * * *